United States Patent [19]

Ryntz

[11] Patent Number: 6,107,404
[45] Date of Patent: Aug. 22, 2000

[54] PAINTABLE, SURFACE-DAMAGE RESISTANT REACTOR GRADE THERMOPLASTIC OLEFIN (TPO)

[75] Inventor: Rose Ann Ryntz, Clinton Township, Mich.

[73] Assignee: Ford Motor Company, Dearborn, Mich.

[21] Appl. No.: 09/221,961

[22] Filed: Dec. 28, 1998

[51] Int. Cl.⁷ .................................. C08F 8/00; C08F 2/00
[52] U.S. Cl. ........................... 525/191; 525/240; 526/201
[58] Field of Search ..................................... 525/191, 240; 526/201

[56] References Cited

U.S. PATENT DOCUMENTS

| | | |
|---|---|---|
| 4,521,566 | 6/1985 | Galli et al. . |
| 4,734,459 | 3/1988 | Cecchin et al. . |
| 4,812,526 | 3/1989 | Rifi . |
| 4,950,720 | 8/1990 | Randall, Jr. et al. . |
| 5,023,300 | 6/1991 | Huff et al. ................. 525/194 |
| 5,066,723 | 11/1991 | Randall, Jr. et al. ............. 525/194 |
| 5,331,054 | 7/1994 | Fujita et al. . |
| 5,519,090 | 5/1996 | Schwager et al. . |
| 5,541,260 | 7/1996 | Pelliconi et al. . |
| 5,624,991 | 4/1997 | Harada et al. . |
| 5,641,848 | 6/1997 | Giacobbe et al. . |
| 5,656,374 | 8/1997 | Marzola et al. . |
| 5,681,897 | 10/1997 | Silvis et al. . |

*Primary Examiner*—Nathan M. Nutter
*Attorney, Agent, or Firm*—Damian Porcari; Roger L. May

[57] ABSTRACT

A paintable, reactor grade thermoplastic olefin (TPO) comprising a blend of elastomer and polypropylene. The elastomer is present in an amount of about 10 to 35% by weight, based on the weight of the TPO. The elastomer comprising about 40 to about 60% by weight polyethylene, based on the weight of the elastomer. The TPO has a viscosity ratio of polypropylene to elastomer of about 50:1 to about 700:1.

20 Claims, No Drawings

PAINTABLE, SURFACE-DAMAGE RESISTANT REACTOR GRADE THERMOPLASTIC OLEFIN (TPO)

TECHNICAL FIELD

The present invention relates to paintable, reactor grade thermoplastic olefins which comprise a reactor blend of polypropylene and elastomer and which have excellent paint adhesion and resistance to cohesive delamination.

BACKGROUND OF THE INVENTION

Thermoplastic olefins (TPO's), which typically comprise polypropylene and an elastomer, have many desirable properties, e.g., lightweight, durability, low cost, etc., that make them an attractive material of construction for many interior and exterior automotive parts. There are two types of TPO's which essentially differ in their method of preparation. The first, which is commonly referred to as "compound grade TPO", is made by physically blending polypropylene with elastomer. The second, which is commonly referred to as "reactor grade TPO" and is more economical to produce than compound grade TPO, is made by first polymerizing propylene to polypropylene and then polymerizing elastomer components, such as ethylene and propylene, in the presence of the polypropylene.

In an attempt to reduce the costs of automotive parts manufactured from TPO's, high flexural modulus TPO's (flexural modulus above about 130,000 psi.) have been used in place of lower flexural modulus TPO's. In employing the use of high flexural modulus TPO over lower flexural modulus TPO's, a raw materials cost savings can be realized since the part may be made thinner than if made with a low flexural modulus TPO due to the increased relative flexural moduli of the TPO's.

Presently, all paintable high flexural modulus TPO's (flexural modulus above 130,000 psi.) are made by blending (i.e., compounding) polypropylene with elastomer. Accordingly, in an effort to further reduce the costs of automotive parts manufactured from high flexural modulus TPO's, it is an object of the present invention to provide reactor grade, high flexural modulus TPO's.

Many of the automotive parts manufactured from TPO's are painted to improve the aesthetic quality of the automotive part. For instance, automobile bumpers formed from TPO's are often painted to match the color of the rest of the automobile's exterior paint. Accordingly, it is another object of the present invention to provide reactor grade, high flexural modulus TPO's having acceptable paint adhesion.

As the use of painted TPO automotive parts has become more prevalent, it has been observed that painted TPO automotive parts are relatively susceptible to damage known as compressive-shear induced delamination (i.e., gouging) as a result of compressive shear loads acting on the part. An example of such a compressive shear load is a shopping cart impacting an automobile bumper. Accordingly, it is a further object of the present invention to provide reactor grade, high flexural modulus TPO's having acceptable paint adhesion and gouge resistant for use in the manufacture of automotive parts.

DISCLOSURE OF THE INVENTION

The present invention achieves the above, and other, objects by providing paintable, reactor grade thermoplastic olefin (TPO's) comprising a reactor blend of elastomer and polypropylene. The elastomer is present in an amount of about 10 to about 35% by weight, based on the weight of the TPO. The elastomer comprises about 40 to about 60% by weight polyethylene, based on the weight of the elastomer. The TPO has a polypropylene to elastomer viscosity ratio of about 50:1 to about 700:1.

The present invention also relates to a method of making a paintable, reactor grade thermoplastic olefins (TPO's). The method comprises preparing polypropylene from propylene monomer. The polypropylene has a number average molecular weight of about 60,000 to about 150,000. Elastomer is then prepared in the presence of the polypropylene to form the TPO. The elastomer is prepared in an amount sufficient to result in the TPO having about 10 to about 35% elastomer by weight, based on the weight of the thermoplastic olefin. Polyethylene is present in the elastomer in an amount about 40 to about 60% by weight, based on the weight of the elastomer. The ratio of the viscosity of the polypropylene of the TPO to the viscosity of the elastomer is about 50:1 to about 700:1.

BEST MODE FOR CARRYING OUT THE INVENTION

The present invention relates to paintable, reactor grade thermoplastic olefins (TPO's), and to a method of making paintable, reaction grade thermoplastic olefins. The paintable, reactor grade thermoplastic olefins of the present invention have a flexural modulus above about 130,000 psi, and are thus, considered "high flexural modulus" thermoplastic olefins. Preferably, the thermoplastic olefins of the present invention have a flexural modulus of about 140,000 psi to about 190,000 psi.

The paintable, reactor grade thermoplastic olefins of the present invention comprise polypropylene and elastomer. The polypropylene is preferably present in the thermoplastic olefin in an amount of about 65 to about 90% by weight, based on the weight of the thermoplastic olefin. The elastomer is preferably present in the thermoplastic olefin in an amount of about 10 to 35% by weight, based on the weight of the thermoplastic olefin. More preferably, the polypropylene is present in the thermoplastic olefin in an amount of about 80 to about 90% by weight, based on the weight of the thermoplastic olefin, and the elastomer is present in an amount of about 10 to about 20% by weight, based on the weight of the thermoplastic olefin. Most preferably, the polypropylene is present in the thermoplastic olefin in an amount of about 90% by weight, based on the weight of the thermoplastic olefin, and the elastomer is present in an amount of about 10% by weight, based on the weight of the thermoplastic olefin.

The polypropylene is relatively viscous, and preferably has a number average (Mn) molecular weight of about 60,000 to about 150,000, and more preferably of about 100,000 to about 140,000. The use of polypropylene having molecular weights below about 60,000 may, among other things, result in thermoplastic olefins having unacceptably low tensile strength. The use of polypropylene having molecular weights above about 150,000 may, among other things, result in thermoplastic olefins having unacceptably high polypropylene to elastomer viscosity ratios.

Preferably, the polypropylene has a molecular weight distribution (Mw/Mn) of about 2 to about 4, and more preferably, of about 2.5 to about 3.5. The molecular weight distribution (Mw/Mn) is a value obtainable by gel permeation chromatography. The polypropylene has a relatively narrow molecular weight distribution because it affords optimum dispersibility with the elastomers.

The polypropylene preferably has a percent crystallinity of between about 45 to about 70%, and more preferably of about 45 to about 55%. The percent crystallinity of the polypropylene is a value measurable on a differential scanning calorimeter. If the percent crystallinity of the polypropylene exceeds about 70%, the resulting thermoplastic olefin may not have acceptable paint adhesion performance. Using a polypropylene having a percent crystallinity below about 45% may result in a thermoplastic olefin having unacceptable gouge characteristics.

The polypropylene may alternatively be an impact-copolymer (ICP) consisting essentially of polyethylene and polypropylene. If impact copolymer is substituted for the polypropylene, the impact copolymer preferably has a percent crystallinity range, molecular weight range, and molecular weight distribution (Mw/Mn) range which are the same as the ranges described above for the polypropylene homopolymer.

Suitable elastomers for use with the present invention include, but are not limited to, copolymers of ethylene and other polyolefins, such as propylene, butene, hexene, or octene.

The number average molecular weight of the elastomer is preferably between about 15,000 to about 50,000, and most preferably between about 20,000 to about 30,000. Problems with the use of elastomers outside of this molecular weight range include, among other things, thermoplastic olefins having unacceptably low tensile strength and unacceptably high polypropylene to elastomer viscosity ratios.

The elastomer preferably comprises about 40 to about 60%, by weight of ethylene, and about 60 to about 40%, by weight of propylene, based on the weight of the elastomer. The elastomer more preferably comprises about 55%, by weight of ethylene, and about 45%, by weight of propylene, based on the weight of the elastomer olefin. If the elastomer comprises more than about 60%, by weight of ethylene, the thermoplastic olefin may, among other things, exhibit poor paint adhesion. If the elastomer comprises less than about 40%, by weight of ethylene, the thermoplastic olefin may, among other things, exhibit poor gouge resistance.

Preferably, the elastomer has a molecular weight distribution (Mw/Mn) of about 1.75 to about 5, and more preferably, of about 2 to about 3. The elastomer has a relatively narrow molecular weight distribution because it, among other things, affords optimum dispersion characteristics with the polypropylene.

The elastomer preferably has a percent crystallinity of between about 14 to about 60%, more preferably from about 30 to about 50%, and most preferably from about 40 to about 50%. If the percent crystallinity of the elastomer exceeds about 60%, the resulting thermoplastic olefin may, among other things, have unacceptable paintability characteristics. Using an elastomer having a percent crystallinity below about 14% may result in a thermoplastic olefin having, among other things, unacceptable gouge characteristics.

The viscosity ratio of polypropylene to elastomer in the thermoplastic olefin is preferably between about 50:1 to 700:1, more preferably between about 50:1 to about 60:1, and most preferably about 52:1 to about 55:1. Thermoplastic olefins having a viscosity ratio of polypropylene to elastomer less than about 50:1 are disadvantageous because the elastomer forms domains which are unacceptably too large. Thermoplastic olefins having a viscosity ratio of polypropylene to elastomer greater than about 700:1 are disadvantageous because the elastomer forms domains which are unacceptably too small.

Since the resulting thermoplastic olefin is reactor grade, the viscosity ratio is measured, in the following manner. After the polypropylene has been formed, the viscosity, or melt flow rate, of the polypropylene produced in the first reaction vessel is measured via ASTM D-1238 Condition E or ASTM D-1238 Condition N. After the thermoplastic olefin has been formed, the viscosity, of melt flow rate, of the thermoplastic olefin produced in the second reaction vessel is then measured via ASTM D-1238 Condition E, and or ASTM D-1238 Condition N. The difference in the viscosities, or melt flow rates, of the polypropylene and the thermoplastic olefin is the viscosity, or the melt flow rate, of the elastomer. The ratio of the polypropylene to the elastomer can then be calculated by simply dividing the viscosity, or melt flow rate, of the polypropylene, by the viscosity, or melt flow rate of the elastomer.

As would be apparent to those skilled in the art of making plastic materials, in addition to elastomer and polypropylene, the thermoplastic olefin of the present invention may include other additives such as stabilizers. Other conventional additives include but are not limited to, antioxidants such as sterically hindered phenols, phosphites, phosphonites, sterically hindered amine light stabilizers, and ultraviolet light absorbers. Additionally, the addition of internal mold release agents such as metal stearates, fatty and wax acids, amides, or esterified polyol esters and lubricants such as thioesters, a low molecular weight olefinic waxes, glycerol monostearate or ethyoxylated fatty amines may be used as processing aids.

The reactor grade thermoplastic olefins of the present invention are preferably prepared by first polymerizing propylene monomer in a reactor vessel such as an autoclave, to form polypropylene homopolymer, and then polymerizing the elastomer components (i.e., ethylene monomer and propylene or other polyolefin monomers) in the presence of the polypropylene homopolymer. The reactor grade thermoplastic olefin is thus an in-situ prepared blend. It should be noted that both polymerization reactions can occur in the same reaction vessel, however, it is preferred that the polypropylene be transferred to a second reaction vessel wherein the second polymerization reaction may take place.

In the first reaction, propylene monomer, preferably in the liquid phase, catalyst and gaseous hydrogen are introduced into a first reaction vessel and the propylene is polymerized until polypropylene having a Mn of about 60,000 to about 150,000 is obtained. The polymerization of propylene occurs in a manner which is well known in the art. The catalyst type, residence time, catalyst amount, hydrogen amount, and amount and feed pressure of propylene all may influence the Mn of the polypropylene.

The pressure in the first reaction vessel must be high enough so that the polymerization occurs at a slow enough rate to produce a high molecular weight polypropylene of desired molecular weight and viscosity, or melt flow rate. Preferably, the pressure in the first reaction vessel is maintained between about 5 to about 60 kg/cm$^2$ g, more preferably between about 25 to about 40 kg/cm$^2$ g, and most preferably at about 30 kg/cm$^2$ g.

The catalyst is preferably a catalyst complex, consisting of a transition metal halide of the high activity Ziegler-type. Particularly preferred catalysts include those described in U.S. Pat. Nos. 4,127,504, 4,330,649, 4,543,400, and 4,547,522; which are incorporated herein by reference. Alternatively, a catalyst system comprising at least one each of a catalyst, a co-catalyst and a modifier, could be used. An especially preferred Ziegler catalyst system comprises about 40 parts per million (ppm) titanium trichloride, about 420 ppm diethyl aluminum chloride (DEC)co-catalyst, and about 27 ppm methyl methacrylate modifier and is commercially available from Mitsui Petrochemical Co., Tokyo, Japan. Another preferred catalyst system comprises a particle form, magnesium halide supported, titanium halide based catalyst with an alkyl-aluminum based co-catalyst and is commercially available under the trade name TK-220 from Mitsui Petrochemical Co., Tokyo, Japan.

The amounts and types of catalyst, including co-catalyst, and modifier, is generally in the range of about 5 ppm to about 600 ppm catalyst by weight, based on the weight of the propylene monomer. Any co-catalyst or modifier may be chosen by one skilled in the art based on the particular amount and type of catalyst, co-catalyst and modifier employed.

The hydrogen is preferably fed into the first reaction vessel in an amount of about 0.1 to about 0.9% by weight, based on the total weight of propylene monomer used to form the polypropylene homopolymer, more preferably about 0.1 to about 0.4 weight percent, and most preferably about 0.2 to about 0.4 weight percent.

The residence time in the first reaction vessel must be long enough to polymerize a substantial portion of the propylene monomer so that as little as possible is carried over to the second reaction vessel and to produce a polypropylene of desired molecular weight and viscosity, or melt flow rate. Preferably, the residence time in the first reaction vessel is at least about 80 minutes, and most preferably at least about 110 minutes.

The resulting polypropylene stream and the catalyst are then preferably transferred from the first reaction vessel to a second reaction vessel. The elastomer component monomers (ethylene and polyolefin) are then added to the contents of the second reactor vessel and are polymerized in the presence of the polypropylene homopolymer to produce a thermoplastic olefin having a viscosity ratio of polypropylene to elastomer of about 50:1 to about 700:1. The resulting thermoplastic olefin comprises an intimately mixed random elastomer copolymer in polypropylene homopolymer.

The amount and feed pressure of the monomer components, the residence time, and amount of hydrogen in the second reaction vessel all may influence the polypropylene to elastomer viscosity ratio of the resulting thermoplastic olefin.

When ethylene and propylene are the monomers used to form the elastomer, the ethylene monomer is preferably fed into the second reaction vessel in a weight ratio with respect to polyolefin monomer (propylene) in the second reaction vessel of about 1:3 to about 1:10, and more preferably about 1:4 to about 1:6. When ethylene is one of the monomers used to form the elastomer, the ethylene monomer is preferably fed into the second reaction vessel in a weight ratio with respect to propylene monomer fed into the first reaction vessel of about 1:10 to about 1:20, and more preferably about 1:15.

The pressure in the second reaction vessel must be high enough so that all gaseous monomers will condense. Preferably, the pressure in the second reaction vessel is maintained between about 5 to about 15 kg/cm$^2$ g, more preferably between about 5 to about 10 kg/cm$^2$ g, and most preferably about 6.5 to about 8.2 kg/cm$^2$ g. The elastomer monomers may be fed either separately or together into the second reaction vessel.

The hydrogen is fed into the second reaction vessel in an amount of about 0.1 to about 0.9% by weight of the total monomer used to form the elastomer, more preferably about 0.1 to about 0.6% by weight, and most preferably about 0.1 to about 0.4% by weight.

The residence time in the second reaction vessel must be long enough to polymerize essentially all of the elastomer monomers to produce elastomer dispersed within the thermoplastic olefin having the desired molecular weight and viscosity, or melt flow rate. Preferably, the residence time in the second reaction vessel is at least about 70 minutes, and most preferably at least about 90 minutes.

The resulting thermoplastic olefin is then taken out of the second reaction vessel in any manner known in the art and then formed in any well known manner in the art, such as extrusion into strands or pellets.

The recovered TPO's can then be formed into components, such as automotive components (i.e., bumpers), by known methods, such as, injection molding, blow molding, compression molding, an extrusion molding. The TPO components may then be painted by any conventional known methods and with any conventional paint system.

The following examples are meant to describe preferred embodiments of the present invention.

EXAMPLES 1–5

The polymerizations for each example are carried out in a stainless steel autoclave equipped with a helical magnetic stirrer operated at about 80 rpm. The gas phase is continuously analyzed by means of a gas chromatograph. The polymerizations are carried out discontinuously in two steps: in the first step, polypropylene is made by homopolymerization of propylene monomer, while in the second step ethylene and propylene are copolymerized.

(A) First Step

For each of examples 1–5, about 15 parts of liquid propylene, gaseous hydrogen and the titanium catalyst are introduced into an autoclave reactor at about 70° C. The hydrogen in the reactor for each example ranges from about 0.2 to about 0.4%, by weight based on weight of the propylene monomer used to form the propylene homopolymer, as shown in Table I below. The amounts of titanium catalyst for each example is in the range of about 5 ppm to about 50 ppm catalyst by weight, based upon the weight of the propylene monomer, as shown below in Table I. The catalyst used for each of the examples comprises about 40 ppm titanium trichloride and 420 ppm of diethyl aluminum chloride.

The temperature for each example in the first reactor is maintained at about 70° C. The pressure for each example in the reactor is maintained at about 30 kg/cm$^2$. The residence time in the first autoclave for each example is about 110 minutes and is sufficient to produce a homopolymer of polypropylene.

(B) Second Step

The temperature of the reactor is reduced to 60° C. and the pressure in the reactor is maintained between 6.5 and 8.2 kg/cm$^2$ g, as shown in Table I below. For each example, 1 part liquid propylene monomer and about 4–6 parts of ethylene monomer are fed into the reactor which contains the resulting polypropylene and the catalyst from the first step, as shown in Table I below. Hydrogen is added to the reactor for each example in an amount of about 0.1 to about 0.4% by weight of the total monomer used to form the elastomer in the second step, as shown in Table I below.

The residence time of the components in the second reactor is between about 90 and about 160 minutes, as shown in Table I below and is sufficient to result in thermoplastic olefin having a polypropylene to elastomer viscosity ratio between about 50:1 to 700:1.

The processing parameters for Examples 1–5 are shown in Table I below.

TABLE I

| 1st Step | 1 | 2 | 3 | 4 | 5 |
|---|---|---|---|---|---|
| Reactor Temp. (° C.) | 70 | 70 | 70 | 70 | 70 |
| Reactor Pressure (kg/cm²g) | 30 | 30 | 30 | 30 | 30 |
| Residence Time (minutes) | 110 | 110 | 110 | 110 | 110 |
| wt. % Hydrogen based on wt. of propylene | 0.2 | 0.4 | 0.2 | 0.4 | 0.4 |
| Catalyst (ppm) | 50 | 5 | 50 | 50 | 5 |
| Propylene (Parts) | 15 | 15 | 15 | 15 | 15 |
| 2nd Step | 1 | 2 | 3 | 4 | 5 |
| Reactor Temp. (° C.) | 60 | 60 | 60 | 60 | 60 |
| Residence Time (minutes) | 90 | 110 | 90 | 160 | 110 |
| Reactor Pressure (kg/cm²g) | 7.6 | 6.5 | 8.0 | 8.2 | 7.6 |
| wt. % Hydrogen based on total monomer in the second step | 0.1 | 0.4 | 0.1 | 0.1 | 0.4 |
| Ethylene (parts) | 4 | 4 | 6 | 6 | 6 |
| Propylene (parts) | 1 | 1 | 1 | 1 | 1 |

The resulting reactor blend TPO's is recovered by continuous countercurrent contacting of the reactor mixture with propylene and iso-butanol, followed by drying at 100° C. in an agitated, nitrogen gas swept drier. The resulting TPO's are extruded into pellets. The elastomer content, elastomer composition, and polypropylene to elastomer viscosity ratio for the TPO's of Examples 1–5 are shown below in

TABLE II

|  | 1 | 2 | 3 | 4 | 5 |
|---|---|---|---|---|---|
| Elastomer Content weight % of elastomer in TPO) | 10 | 10 | 10 | 35 | 10 |
| Elastomer Composition (weight % of ethylene in elastomer) | 40 | 40 | 60 | 60 | 60 |
| PP/elastomer viscosity ratio | 50 | 700 | 50 | 50 | 700 |

The pellets are injection molded into 4"×12"×32 mm thick plaques. The plaques were painted with commercially available adhesion promotor (solvent based chlorinated polyolefin), one component melamine crosslinked basecoat, two component isocyanate crosslinked clearcoat. Spray application, via air atomization, accomplished dry film thicknesses of the solvent based paints of 7.5 microns adhesion promoter, 37 microns white basecoat, and 37 microns clearcoat. Bake was accomplished for 30 minutes at 121° C. Film application was wet-on-wet-on-wet.

Gasoline soak and friction induced paint damage (FIPD) were tested on each of the painted specimens from Examples 1–5.

FIPD measures cohesive delamination (gouge) as a result of compressive shear force and is measured in accordance with Ford protocol as follows. A painted substrate from Examples 1–5 is mounted on a slidable member. A cylindrical steel member having a polyamide member secured to an end of the steel member is placed on the substrate so that the polyamide member abuts the substrate. A load of about 600 lbs. is applied to the steel member. The slidable member is slid about 4" in one direction at a velocity of 0.875 in/sec. The area of damage (FIPD) is measured. This is repeated for each of the substrates of Examples 1–5. The results are shown in Table III.

Gas soak measures paint adhesion and is measured in accordance with Ford protocol as follows. 100 uniform squares are etched in the painted surface of a painted substrate from Examples 1–5. The substrate is submerged in CE-10 (10% ethanol, 90% 50/50 w/w isooctane/toluene) for about 15 minutes. The % of the squares which release from the substrate is determined. This is repeated for each of the substrates of Examples 1–5. The results are shown in Table III.

TABLE III

| RESULTS | 1 | 2 | 3 | 4 | 5 |
|---|---|---|---|---|---|
| Gas soak % | 5 | 0 | 0 | 5 | 0 |
| FIPD (mm²) | 0 | 0 | 0 | 0 | 0 |

As can be seen from the above examples, the thermoplastic olefins of the present invention have excellent paint adhesion (as shown by the gas soak test) and gouge resistance (as shown by the FIPD test).

While the best modes for carrying out the invention have been described in detail, those familiar with the art to which this invention relates will recognize various alternative designs and embodiments for practicing the invention as defined by the following claims.

What is claimed is:

1. A paintable, reactor grade thermoplastic olefin (TPO) comprising a reactor blend of elastomer and polypropylene, the elastomer being present in an amount of about 10 to 35% by weight, based on the weight of the TPO, the elastomer comprising about 40 to about 60% by weight polyethylene, based on the weight of the elastomer, and the TPO having a viscosity ratio of polypropylene to elastomer of about 50:1 to about 700:1.

2. The paintable reactor grade TPO of claim 1 wherein the polypropylene has a number average molecular weight of about 60,000 to about 150,000.

3. The paintable reactor grade TPO of claim 1 wherein the elastomer has a number average molecular weight of about 15,000 to about 50,000.

4. The paintable reactor grade TPO of claim 1 wherein TPO has a flexural modulus above about 130,000 psi.

5. The paintable reactor grade TPO of claim 1 wherein the TPO has a polypropylene to elastomer viscosity ratio of about 50:1 to about 60:1.

6. The paintable reactor grade TPO of claim 1 wherein the polypropylene is present in an amount of about 80 to about 90% by weight, based on the weight of the TPO, and the elastomer is present in an amount of about 10 to about 20% by weight, based on the weight of the TPO.

7. The paintable reactor grade TPO of claim 1 wherein the polypropylene has a molecular weight distribution of about 2 to about 4.

8. The paintable reactor grade TPO of claim 1 wherein the polypropylene has a percent crystallinity of between 45 to about 70%.

9. The paintable reactor grade TPO of claim 1 wherein the elastomer has a percent crystallinity of between about 14 to about 60%.

10. The paintable reactor grade TPO of claim 1 wherein the elastomer comprises polypropylene and polyethylene.

11. The method of making paintable, reactor grade thermoplastic olefins (TPO's), the method comprising:

preparing polypropylene from propylene monomer, the polypropylene having a number average molecular weight of about 60,000 to about 150,000; and preparing elastomer in the presence of the polypropylene to form the TPO, the elastomer being prepared in an amount sufficient to result in the TPO having about 10 to about 35% elastomer by weight, based on the weight of the thermoplastic olefin;

the elastomer comprising polyethylene, the polyethylene being present in the elastomer in an amount about 40 to about 60% by weight, based on the weight of the elastomer; and the ratio of the viscosity of the polypropylene of the TPO to the viscosity of the elastomer being about 50:1 to about 700:1.

12. The method of claim 11 wherein a reaction vessel having a pressure maintained between about 5 to about 60 kg/cm² g is provided for preparing the polypropylene.

13. The method of claim 12 wherein the residence time of the propylene in the reactor, before preparing the elastomer, is at least about 80 minutes.

14. The method of claim 13 wherein hydrogen is introduced into the reactor when preparing the polypropylene in an amount of about 0.1 to about 0.9 weight percent based on the weight of the propylene monomer employed for preparing the polypropylene.

15. The method of claim 14 wherein catalyst in an amount of about 5 to about 600 ppm, based on the weight of propylene introduced into the reactor for preparing the polypropylene, the weight ratio of the ethylene monomer for preparing the elastomer to the propylene monomer for preparing the polypropylene being between about 1:10 to about 1:20.

16. The method of claim 11 wherein the elastomer has a number average molecular weight of about 15,000 to about 50,000.

17. The method of claim 11 wherein TPO has a flexural modulus above about 130,000 psi.

18. The method of claim 11 wherein the polypropylene is present in an amount of about 80 to about 90% by weight, based on the weight of the TPO, and the elastomer is present n an amount of about 10 to about 20% by weight, based on the weight of the TPO.

19. The method of claim 11 wherein the polypropylene has a percent crystallinity of between 45 to about 70%.

20. The method of claim 11 wherein the elastomer has a percent crystallinity of between about 14 to about 60%.

* * * * *